United States Patent
Zhao et al.

(10) Patent No.: US 12,120,710 B2
(45) Date of Patent: Oct. 15, 2024

(54) APPARATUS AND METHOD FOR TRANSMITTING OR RECEIVING PHYSICAL SIDELINK BROADCAST CHANNEL

(71) Applicant: GUANGDONG OPPO MOBILE TELECOMMUNICATIONS CORP., LTD., Dongguan (CN)

(72) Inventors: Zhenshan Zhao, Dongguan (CN); Qianxi Lu, Dongguan (CN); Huei-Ming Lin, South Yarra (AU)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 206 days.

(21) Appl. No.: 17/564,884

(22) Filed: Dec. 29, 2021

(65) Prior Publication Data

US 2022/0124677 A1    Apr. 21, 2022

Related U.S. Application Data

(63) Continuation of application No. PCT/CN2020/109877, filed on Aug. 18, 2020.
(Continued)

(30) Foreign Application Priority Data

Feb. 27, 2020 (WO) ................ PCT/CN2020/077033

(51) Int. Cl.
*H04W 72/30* (2023.01)
*H04L 5/00* (2006.01)

(52) U.S. Cl.
CPC ........... *H04W 72/30* (2023.01); *H04L 5/0053* (2013.01)

(58) Field of Classification Search
CPC .... H04W 72/23; H04W 72/56; H04L 5/0053; H04L 5/0094; H04L 5/0044
See application file for complete search history.

(56) References Cited

U.S. PATENT DOCUMENTS

2019/0254013 A1* 8/2019 Chang ...................... H04L 5/00
2019/0281587 A1* 9/2019 Zhang .................. H04W 72/23
(Continued)

FOREIGN PATENT DOCUMENTS

CN    106162597 A    11/2016
CN    110392431 A    10/2019
(Continued)

OTHER PUBLICATIONS

Extended European Search Report for European Patent Application No. 23179410.8, dated Aug. 11, 2023.
(Continued)

*Primary Examiner* — Mahran Y Abu Roumi
(74) *Attorney, Agent, or Firm* — Sheppard, Mullin, Richter & Hampton LLP (57) ABSTRACT

An apparatus and a method for transmitting or receiving a physical sidelink broadcast channel (PSBCH) are provided. The method for transmitting a PSBCH of a first user equipment includes transmitting, to one or more second user equipments, a PSBCH carrying information, and the information carried in the PSBCH is used to determine a periodicity and a number of slots. This can reduce a payload size of the information carried in the PSBCH.

16 Claims, 2 Drawing Sheets

Related U.S. Application Data (60) Provisional application No. 62/938,925, filed on Nov. 21, 2019.

(56) References Cited

U.S. PATENT DOCUMENTS

| | | | | |
|---|---|---|---|---|
| 2020/0053743 | A1* | 2/2020 | Cheng | H04W 4/40 |
| 2021/0168574 | A1* | 6/2021 | Zhang | H04W 16/28 |

FOREIGN PATENT DOCUMENTS

| | | |
|---|---|---|
| CN | 110536449 A | 12/2019 |
| WO | WO 2018/031061 A1 | 2/2018 |

OTHER PUBLICATIONS

First Office Action of Chinese Patent Application No. 202210209012. X, dated Jun. 22, 2023.

Notification to Grant of Chinese Patent Application No. 202210209012. X, dated Aug. 29, 2023.

Spreadtrum Communications, Discussion on physical layer structure for sidelink, R1-1910005, 3GPP TSG RAN WG1 #98bis, Chongqing, China, Oct. 14-20, 2019.

English translation of International Search Report of PCT/CN2020/109877, mailed from China National Intellectual Property Administration on Oct. 28, 2020.

English translation of International Search Report of PCT/CN2020/077033, mailed from China National Intellectual Property Administration on Aug. 19, 2020.

Catt, "Sidelink synchronization mechanism in NR V2X," R1-1910330, 3GPP TSG RAN WG1 Meeting #98bis, Chongqing, China, Oct. 14-18, 2019.

Oppo, "Discussion of synchronization mechanism for NR-V2X," R1-1910374, 3GPP TSG RAN WG1 #98bis, Chongqing, China, Oct. 14-20, 2019.

Catt, " Sidelink synchronization mechanism in NR V2X," R1-1912156, 3GPP TSG RAN WG1 Meeting #99, Reno, USA, Nov. 18-22, 2019.

Oppo, "Discussion of synchronization mechanism for NR-V2X," R1-1912791, 3GPP TSG RAN WG1 #99, Reno, USA, Nov. 18-22, 2019.

Technical Specification Group Radio Access Network, "3rd Generation Partnership Project," 3GPP TS 38.213 V15.7.0 (Sep. 2019).

Extended European Search Report for European Application No. 20889048.3, dated Jul. 25, 2022.

First Examination Report issued in Indian Patent Application No. 202127061591, dated Jun. 29, 2022.

Vivo, R1-1912024, "Sidelink synchronization mechanism," 3GPP TSG RAN WG1 Meeting #99, Reno, USA, Nov. 18-22, 2019.

Written Opinion dated Mar. 14, 2024 for Singapore Application No. 11202200480W.

Notice of Reasons for Refusal for Japanese Patent Application No. 2022-504222 mailed on Jul. 9, 2024.

\* cited by examiner

APPARATUS AND METHOD FOR TRANSMITTING OR RECEIVING PHYSICAL SIDELINK BROADCAST CHANNEL

CROSS-REFERENCE TO RELATED APPLICATION

The present application is a continuation application of International Application No. PCT/CN2020/109877, filed on Aug. 18, 2020, which claims priorities to U.S. provisional application 62/938,925, filed on Nov. 21, 2019 and PCT Patent Application No. PCT/CN2020/077033, filed on Feb. 27, 2020. The present application claims priority and the benefit of the above-identified applications and the above-identified applications are incorporated by reference herein in their entireties.

BACKGROUND OF DISCLOSURE

1. Field of Disclosure

The present disclosure relates to the field of communication systems, and more particularly, to an apparatus and a method for transmitting or receiving a physical sidelink broadcast channel (PSBCH).

2. Description of Related Art

Sidelink (SL) technologies developed under 3rd generation partnership project (3GPP) for device-to-device (D2D) wireless communication directly from one user equipment (UE) to another UE have been traditionally designed to provide mission critical communication for public safety (PS) services and vehicle-to-everything (V2X) communication for intelligent transportation system (ITS) including road safety use cases. Under those applications and services, an important objective is to provide a reliable sidelink (SL) communication system since the safety of PS personnel and road users such as drivers, riders, and pedestrians are on the line. In order to ensure their safety from providing a reliable D2D system, the design of SL communication has been focusing on broadcast type of transmission/communication.

Further, D2D communication includes a mutual discovery of D2D terminals in a in coverage (IC) scenario, and broadcast communications between D2D terminals in a in coverage (IC) scenario, a partial coverage (PC) scenario, and an out of coverage (OC) scenario. D2D terminals can be user equipments (UEs), for example.

For UEs participating in a D2D broadcast communication, when a UE locating in coverage of a cell (ICUE) receives information configured by a network node (such as a base station), the UE needs to transmit a physical sidelink broadcast channel (PSBCH) carrying the information to an out of coverage UE (OCCUE).

If all information having a large payload size is carried in the PSBCH, that will result in too large payload size for the PSBCH. So far, there has been no mature implementation scheme about how to reduce a payload size for the information.

Therefore, there is a need for an apparatus and a method for transmitting or receiving a physical sidelink broadcast channel (PSBCH), which can solve issues in the prior art and reduce a payload size of the information carried in the PSBCH.

SUMMARY

An object of the present disclosure is to propose an apparatus and a method for transmitting or receiving a physical sidelink broadcast channel (PSBCH), which can solve issues in the prior art and reduce a payload size of the information carried in the PSBCH.

In a first aspect of the present disclosure, a method for transmitting a physical sidelink broadcast channel (PSBCH) of a first user equipment comprises transmitting, to one or more second user equipments, a PSBCH carrying information, wherein the information carried in the PSBCH is used to determine a periodicity and a number of slots.

In a second aspect of the present disclosure, a first user equipment for transmitting a physical sidelink broadcast channel (PSBCH) comprises a memory, a transceiver, and a processor coupled to the memory and the transceiver. The processor is configured to control the transceiver to transmit, to one or more second user equipments, a PSBCH carrying information, and the information carried in the PSBCH is used to determine a periodicity and a number of slots.

In a third aspect of the present disclosure, a method for receiving a physical sidelink broadcast channel (PSBCH) of a second user equipment comprises receiving, from one or more first user equipments, a PSBCH carrying information, wherein the information carried in the PSBCH is used to determine a periodicity and a number of slots.

In a fourth aspect of the present disclosure, a second user equipment for receiving a physical sidelink broadcast channel (PSBCH) comprises a memory, a transceiver, and a processor coupled to the memory and the transceiver. The processor is configured to control the transceiver to receive, from one or more first user equipments, a PSBCH carrying information, wherein the information carried in the PSBCH is used to determine a periodicity and a number of slots.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the implementations of the present disclosure or related art, the following figures will be described in the implementations are briefly introduced. It is obvious that the drawings are merely some implementations of the present disclosure, a person having ordinary skill in this field can obtain other figures according to these figures without paying the premise.

DETAILED DESCRIPTION OF IMPLEMENTATIONS

Implementations of the present disclosure are described in detail with the technical matters, structural features, achieved objects, and effects with reference to the accompanying drawings as follows. Specifically, the terminologies in the implementations of the present disclosure are merely for describing the purpose of the certain implementation, but not to limit the disclosure.

In some implementations, a physical sidelink broadcast channel (PSBCH) (such as a new radio-vehicle-to-everything PSBCH, NR-V2X PSBCH) is used to indicate information (such as a time division duplex configuration, TDD configuration). For a partial coverage scenario, a user equipment locating in coverage of a cell (ICUE) can transmit PSBCH carrying information configured by a network node (such as a base station) configuration to an out of coverage UE (OCCUE). The information (such as a TDD configuration) configured by the network node is by a radio resource control (RRC) signaling or system information block (SIB).

Current detailed signaling is as follows:

nrofDownlinkSlots:
Number of consecutive full DL slots at a beginning of each DL-UL pattern, referring to 3GPP TS 38.213, clause 11.1. In this release, the maximum value for this field is 80.

nrotDownlinkSymbols:
Number of consecutive DL symbols in the beginning of the slot following the last full DL slot (as derived from nrofDownlinkSlots). The value 0 indicates that there is no partial-downlink slot. (referring to 3GPP TS 38.213, clause 11.1).

nrofUplinkSlots:
Number of consecutive full UL slots at the end of each DL-UL pattern, referring to 3GPP TS 38.213, clause 11.1. In this release, the maximum value for this field is 80.

nrofUplinkSymbols:
Number of consecutive UL symbols in the end of the slot preceding the first full UL, slot (as derived from nrofUplinkSlots). The value 0 indicates that there is no partial-uplink slot. (referring 3GPP TS 38.213, clause 11.1).

If all of the above current information is carried in the PSBCH, that will result in too large payload size for the PSBCH. Therefore, some implementations of the present disclosure provide an apparatus and a method for transmitting or receiving a physical sidelink broadcast channel (PSBCH), which can solve issues in the prior art and reduce a payload size of the information carried in the PSBCH.

Figure 1:
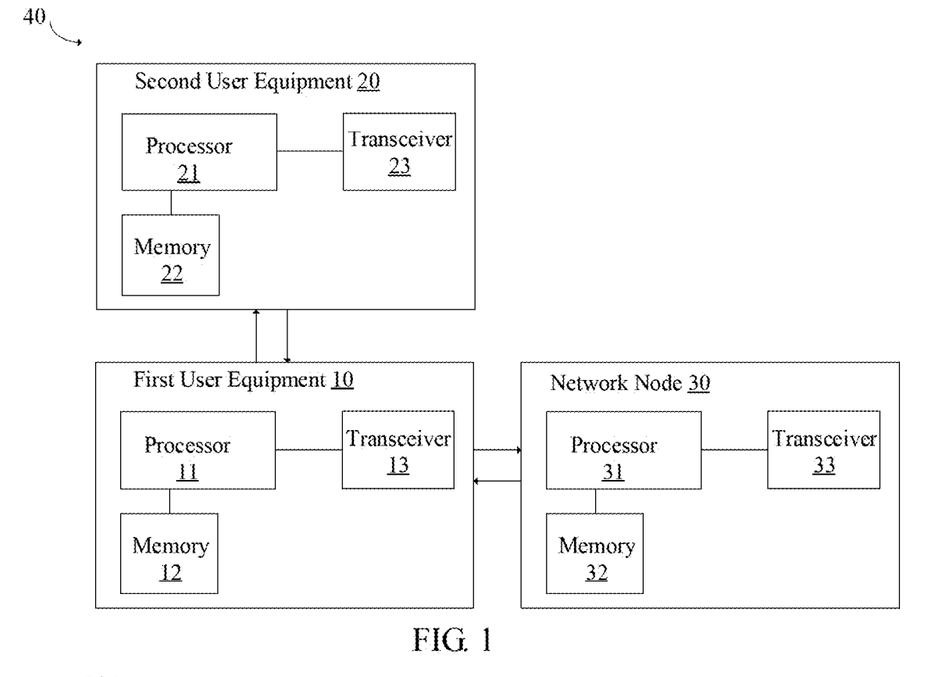
FIG. 1 is a block diagram of a first user equipments (UE), a second UE, and a network node (such as, base station. BS) (e.g., gNB) of communication in a communication network system according to an implementation of the present disclosure.

FIG. 1 illustrates that, in some implementations, a first user equipment (UE) 10, a second UE 20, and a network node 30 (such as, base station, BS) (e.g., gNB) of commu-

```
TDD-UL-DL-ConfigCommon ::= SEQUENCE {
    refereneeSubcarrierSpacing SubcarrierSpacing,
    pattern1 TDD-UL-DE-Pattern,
    pattern2 TDD-UL-DL-Pattern
OPTIONAL, -- Need R
    ...
}
TDD-UL-DL-Pattern ::= SEQUENCE {
    dl-UL-TransmissionPeriodicity ENUMERATED {ms0p5, ms0p535, ms1, ms1p25, ms2,
ms2p5,
ms5, ms10},
    nrofDownlinkSlots INTEGER (0..maxNrofSlots),
    nrofDownlinkSymbols INTEGER (0..maxNrofSymbols-1),
    nrofUplinkSlots INTEGER (0..max-NrotSlots),
    nrotUplinkSymbols INTEGER (0..maxNrotSymbols-1),
}
maxNrofSlots INTEGER ::= 320 -- Maximum number of slots in a 10 ms
period
maxNrotSymbols-1 INTEGER ::= 13 -- Maximum index identifying a symbol
within a slot (14 symbols, indexed from 0..13)
SubcarrierSpacing ::= ENUMERATED {kHz15, kHz30, kHz60, kHz120, kHz240, spare3,
spare2, spare1}
```

ReferenceSubcarrierSpacing:
Reference subcarrier spacing (SCS) is used to determine time domain boundaries in a uplink-downlink (UL-DL) pattern which must be common across all subcarrier specific carriers, i.e., independent of an actual subcarrier spacing using for data transmission. Only values 15, 30 or 60 kHz (<6 GHz) and 60 or 120 kHz (>6 GHz) are applicable. A network node (such as a base station) configures a not larger than any SCS of configured bandwidth parts (BWPs) for a serving cell. Corresponds to L1 parameter "reference-SCS" (referring to 3GPP TS 38.213, clause 11.1).

dl-UL-TransmissionPeriodicity:
Periodicity of the DL-UL pattern can be referred to 3GPP TS 38.213, clause 11.1. If the dl-UL-TransmissionPeriodicity-v1530 is signalled, a UE shall ignore the dl-UL-TransmissionPeriodicity (without suffix).

nication in a communication network system according to an implementation of the present disclosure. The communication network system 40 includes one or more first UEs 10 of a cell, one or more second UEs 20 out of the cell, and the network node 30. The first UE 10 may include a memory 12, a transceiver 13, and a processor 11 coupled to the memory 12 and the transceiver 13. The second UE 20 may include a memory 22, a transceiver 23, and a processor 21 coupled to the memory 22 and the transceiver 23. The network node 30 may include a memory 32, a transceiver 33, and a processor 31 coupled to the memory 32, the transceiver 33. The processor 11 or 21 or 31 may be configured to implement proposed functions, procedures and/or methods described in this description. Layers of radio interface protocol may be implemented in the processor 11 or 21 or 31. The memory 12 or 22 or 32 is operatively coupled with the processor 11 or 21 or 31 and stores a variety of information to operate the processor 11 or 21 or 31. The transceiver 13 or 23 or 33 is operatively coupled with the processor 11 or 21 or 33, and the transceiver 13 or 23 or 33 transmits and/or receives a radio signal.

The processor 11 or 21 or 31 may include application-specific integrated circuit (ASIC), other chipset, logic circuit and/or data processing device. The memory 12 or 22 or 32 may include read-only memory (ROM), random access memory (RAM), flash memory, memory card, storage medium and/or other storage device. The transceiver 13 or 23 or 33 may include baseband circuitry to process radio frequency signals. When the implementations are implemented in software, the techniques described herein can be implemented with modules (e.g., procedures, functions, and so on) that perform the functions described herein. The modules can be stored in the memory 12 or 22 or 32 and executed by the processor 11 or 21 or 31. The memory 12 or 22 or 32 can be implemented within the processor 11 or 21 or 31 or external to the processor 11 or 21 or 31 in which case those can be communicatively coupled to the processor 11 or 21 or 31 via various means as is known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) long term evolution (LTE) and new radio (NR) Release 16 and beyond. UEs are communicated with each other directly via a sidelink interface such as a PC5 interface. Some implementations of the present disclosure relate to sidelink communication technology in 3GPP NR release 16 and beyond.

In some implementations, the processor 11 of the first UE 10 is configured to control the transceiver 13 to transmit, to one or more second UEs, a PSBCH carrying information, and the information carried in the PSBCH is used to determine a periodicity and a number of slots. The information comprises a slot format indication (SFI). The information also comprises a time division duplex (TDD) configuration. This can reduce a payload size of the information (such as a TDD configuration) carried in the PSBCH.

In some implementations, the processor 21 of the second UE 20 is configured to control the transceiver 23 to receive, from one or more first user UE 10, a PSBCH carrying information, wherein the information carried in the PSBCH is used to determine a periodicity and a number of slots. The information also comprises a time division duplex (TDD) configuration. This can reduce a payload size of the information (such as a TDD configuration) carried in the PSBCH.

Figure 2:
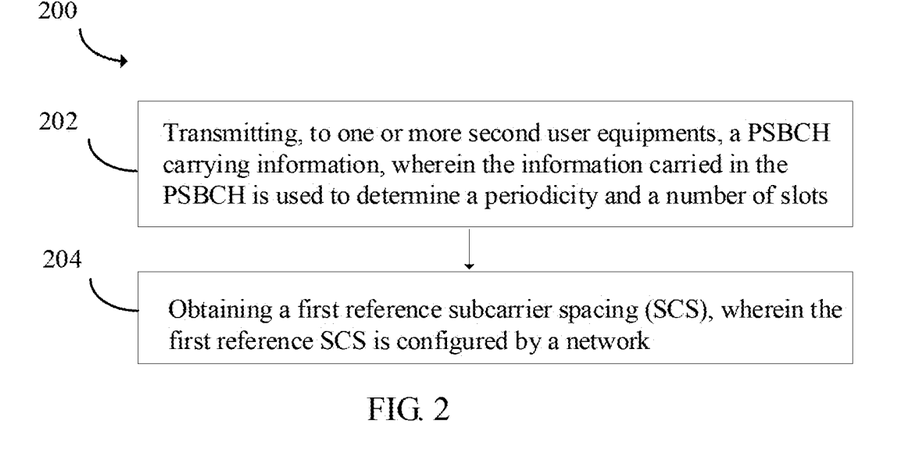
FIG. 2 is a flowchart illustrating a method for transmitting a physical sidelink broadcast channel (PSBCH) of a first user equipment according to an implementation of the present disclosure.

FIG. 2 illustrates a method 200 for transmitting a physical sidelink broadcast channel (PSBCH) of a first user equipment according to an implementation of the present disclosure. The method 200 includes: a block 202, transmitting, to one or more second user equipments, a PSBCH carrying information, wherein the information carried in the PSBCH is used to determine a periodicity and a number of slots. In some implementations, the information comprises a slot format indication (SFI). In some implementations, the information comprises a time division duplex (TDD) configuration. Either the SFI or the TDD configuration is used to determine the resources of UL or SL. This can reduce a payload size of the information (such as a TDD configuration) carried in the PSBCH. In some implementations, the method 200 further includes: a block 204, obtaining a first reference subcarrier spacing (SCS), wherein the first reference SCS is configured by a network.

Figure 3:
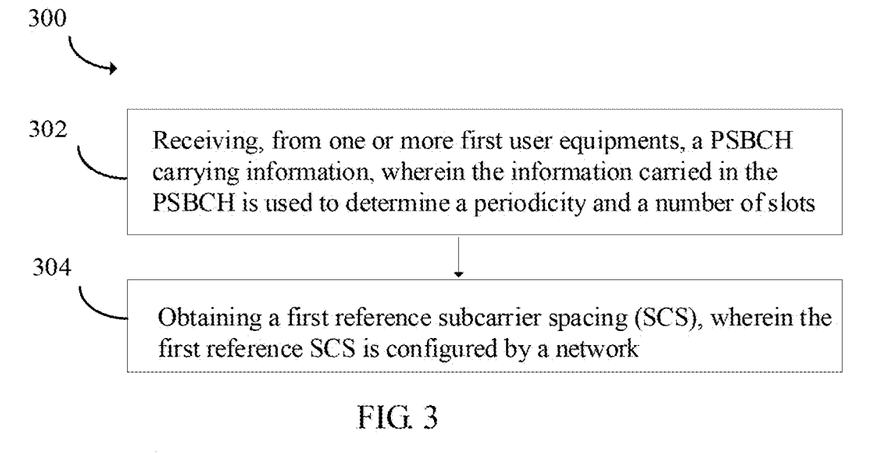
FIG. 3 is a flowchart illustrating a method for receiving a physical sidelink broadcast channel (PSBCH) of a second user equipment according to an implementation of the present disclosure.

FIG. 3 illustrates a method 300 for receiving a physical sidelink broadcast channel (PSBCH) of a second user equipment according to an implementation of the present disclosure. The method 300 includes: a block 302, receiving, from one or more first user equipments, a PSBCH carrying information, wherein the information carried in the PSBCH is used to determine a periodicity and a number of slots. In some implementations, the information comprises a slot format indication (SFI). In some implementations, the information comprises a time division duplex (TDD) configuration. Either the SFI or the TDD configuration is used to determine the resources of UL or SL. This can reduce a payload size of the information (such as a TDD configuration) carried in the PSBCH. In some implementations, the method 300 further includes: a block 304, obtaining a first reference subcarrier spacing (SCS), wherein the first reference SCS is configured by a network.

In some implementations, the slots comprise uplink (UL) slots. In some implementations, the slots comprise sidelink (SL) slots.

In some implementations, the information carried in the PSBCH is used to determine the number of UL slots. In some implementations, the information carried in the PSBCH is used to determine the number of SL slots.

In some implementations, only a pattern 1 is configured by a network, the information carried in PSBCH is determined by parameters configured in pattern 1. In some implementations, the periodicity which is determined by the information carried in the PSBCH is determined by a periodicity configured in the pattern 1. In some implementations, the number of slots which is determined by the information carried in the PSBCH is determined by a number of slots configured in the pattern 1. In some implementations, the slots configured in the pattern 1 comprise UL slots. In some implementations, the number of slots which is determined by the information carried in the PSBCH is determined by the number of UL slots configured in the pattern 1.

In some implementations, both a pattern 1 and a pattern 2 are configured by the network, the information carried in PSBCH is determined by parameters configured in pattern 1 and/or pattern 2. In some implementations, the periodicity which is determined by the information carried in the PSBCH is determined by a first periodicity configured in the pattern 1 and a second periodicity configured in the pattern 2. In some implementations, the number of slots which is determined by the information carried in the PSBCH is determined by a number of slots configured in at least one of the pattern 1 and the pattern 2. In some implementations, the slots configured in at least one of the pattern 1 and the pattern 2 comprise UL slots. In some implementations, the pattern 1 and the pattern 2 are adjacent to each other. In some implementations, the number of slots which is determined by the information carried in the PSBCH is determined by a number of UL slots configured in at least one of the pattern 1 and the pattern 2. In some implementations, the pattern 2 comprises only UL, slots, the number of slots which is determined by the information carried in the PSBCH is determined by the number of UL slots configured in both the pattern 1 and the pattern 2.

Some implementations further comprise obtaining a first reference subcarrier spacing (SCS), wherein the first reference SCS is configured by a network. In some implementations, the number of slots which is determined by the information carried in the PSBCH is further determined by the first reference SCS and a second reference SCS, wherein the second reference SCS is pre-configured, or pre-defined, or determined by the information carried in the PSBCH. In some implementations, the information carried in the PSBCH is further used to determine the second reference SCS.

In some implementations, the number of slots which is determined by the information carried in the PSBCH is determined by the number of UL slots configured in the pattern 1 and the scaling factor between the first reference SCS and the second reference SCS. In some implementations, the number of slots which is determined by the information carried in the PSBCH is determined by the number of UL slots configured in at least one of the pattern 1 and the pattern 2, and the scaling factor between the first reference SCS and the second reference SCS.

In some implementations, when the first reference SCS is N times of the second reference SCS, the number of slots which is determined by the information carried in the PSBCH is N times of the number of slots configured in at least one of the pattern 1 and the pattern 2. In some implementations, when the second reference SCS is N times of the first reference SCS, the number of slots configured in at least one of the pattern 1 and the pattern 2 is N times of the number of slots which is determined by the information carried in the PSBCH.

In some implementations, the information carried in the PSBCH further determines a number of symbols. In some implementations, the symbols comprise UL symbols. In some implementations, the symbols comprise SL symbols.

In some implementations, the first user equipment is in coverage of a cell, and the second user equipment is out coverage of the cell.

In some implementations, if a network node (such as a base station) configures both pattern 1 and pattern 2, the following information is determined by the information carried in PSBCH:
1. Periodicity.
2. Number of UL slots or number of SL slots.
Reference SCS.

The periodicity is a determined by periodicities configured in pattern 1 and pattern 2, the number of UL slots is determined by the number of UL shots that is configured in pattern 2, reference SCS is the reference subcarrier spacing which is used to determine the time domain boundaries. If SL is deployed on Uu carrier, only UL resource can be used for SL transmission. For example, for TDD system, only UL slots or UL symbols can be used for SL transmission; for frequency division duplex (FDD) system, SL transmission can only be deployed on UL band. Alternatively, the number of SL slots and/or number of SL symbols can be indicated in the PSBCH. In another implementation, the number of SL slots and/or number of SL symbols can be determined by the information carried in the PSBCH. The number of SL slots is determined by number of UL slots configured in at least one of pattern 1 and pattern 2. The number of SL symbols is determined by number of UL symbols configured in at least one of pattern 1 and pattern 2.

One implementation is that the periodicity which is determined by the information carried in PSBCH is summary of the periodicities configured in pattern 1 and pattern 2.

For example, the network node configures both pattern 1 and pattern 2 in TDD-UL-DL-ConfigCommon. And the parameter referenceSubcarrierSpacing is set to 15 kHz. In pattern 1, the parameter dl-UL-TransmissionPeriodicity is set to 5 ms (another example can be 3 ms), the number of UL slots is set to 1. In pattern 2, the parameter dl-UL-TransmissionPeriodicity is set to 5 ms (another example can be 7 ms), the number of UL slots is set to 3.

For the PSBCH, the parameter reference SCS is set to 15 kHz, which is set to the same value of parameter referenceSubcarrierSpacing configured by the network node. The parameter of periodicity in the PSBCH is summary of the parameter dl-UL-TransmissionPeriodicity in both pattern 1 and pattern 2. Therefore, the periodicity is 10 ms. The information of number of UL (or SL) slots in the PSBCH is determined by the number of UL slots in pattern 2. Then number of UL (or SL) slots in the PSBCH is 3.

For example, the network node configures both pattern 1 and pattern 2 in TDD-UL-DL-ConfigCommon. And the parameter referenceSubcarrierSpacing is set to 15 kHz. In pattern 1, the parameter dl-UL-TransmissionPeriodicity is set to 5 ms (another example can be 3 ms), the number of UL slots is set to 1. In pattern 2, the parameter dl-UL-TransmissionPeriodicity is set to 5 ms (another example can be 7 ms), the number of UL slots is set to 3.

For the PSBCH, the parameter reference SCS can be set to 30 kHz, which is double of parameter referenceSubcarrierSpacing configured by the network node. The parameter of periodicity in PSBCH is summary of the parameter dl-UL-TransmissionPeriodicity in both pattern 1 and pattern 2. Therefore, the periodicity is 10 ms. The information of number of UL (or SL) slots in PSBCH is determined by the number of UL slots in pattern 2 and the scale between the reference SCS in PSBCH and the referenceSubcarrierSpacing. Then number of UL (or SL) slots in PSBCH is 6, which corresponds to 3 UL slots in pattern 2 considering the different reference SCS. The above implementations can reduce a payload size of the information (such as a TDD configuration) carried in the PSBCH. Further, in the above implementations, the slot structure is flexible to provide for better spectrum utilization.

In some implementations, if a network node (such as a base station) configures both pattern 1 and pattern 2, the following information is determined by the information carried in PSBCH:
1. Periodicity.
2. Number of UL slots or number of SL slots.

The periodicity is determined by periodicities configured in pattern 1 and pattern 2, the number of UL slots is determined by the number of UTL shots that is configured in pattern 2. If SL is deployed on Uu carrier, only UL resource can be used for SL transmission. For example, for TDD system, only UTL slots or UL symbols can be used for SL transmission; for FDD system. SL transmission can only be deployed on UL band. Alternatively, the number of SL slots and/or number of SL symbols can be indicated in PSBCH. In another implementation, the number of SL slots and/or number of SL symbols can be determined by the information carried in the PSBCH. The number of SL slots is determined by number of UL slots configured in at least one of pattern 1 and pattern 2. The number of SL symbols is determined by number of UL symbols configured in at least one of pattern 1 and pattern 2.

One implementation is that the periodicity which is determined by the information carried in PSBCH is summary of the periodicities configured in pattern 1 and pattern 2.

For example, the network node configures both pattern 1 and pattern 2 in TDD-UL-DL-ConfigCommon. And the parameter referenceSubcarrierSpacing (marked as the first reference SCS) is set to 15 kHz. In pattern 1, the parameter dl-UTL-TransmissionPeriodicity is set to 5 ms (another example can be 3 ms), the number of UTL slots is set to 1.

In pattern 2, the parameter dl-UL-TransmissionPeriodicity is set to 5 ms (another example can be 7 ms), the number of UL slots is set to 3.

In one implementation, a pre-defined reference SCS (marked as the second reference SCS) is 15 kHz. The parameter of periodicity in PSBCH is summary of the parameter dl-UL-TransmissionPeriodicity in both pattern 1 and pattern 2. Therefore, the periodicity is 10 ms. The information of number of UL (or SL) slots in PSBCH is determined by the number of UL slots in pattern 2. Since the parameter referenceSubcarrierSpacing is same as the second reference SCS, the number of UL (or SL) slots in PSBCH is 3.

In one implementation, the pre-defined reference SCS (marked as the second reference SCS) is 30 kHz. The parameter of periodicity in the PSBCH is summary of the parameter dl-UL-TransmissionPeriodicity in both pattern 1 and pattern 2. Therefore, the periodicity is 10 ms. The information of number of UL (or SL) slots in the PSBCH is determined by the number of UL slots in pattern 2. Considering the second reference SCS doubles the parameter referenceSubcarrierSpacing, the number of UL slots in PSBCH is 6, which is determined by the number of UL slots in pattern 2 and the scale between the second reference SCS and referenceSubcarrierSpacing. The above implementations can reduce a payload size of the information (such as a TDD configuration) carried in the PSBCH. Further, in the above implementations, the slot structure is flexible to provide for better spectrum utilization.

In one implementation, 12 bits (i.e., $a_0, a_1, a_2, a_3, \ldots, a_{11}$) in PSBCH are used to indicate SL TDD configuration.

$a_0$ is used to differentiate whether one pattern or two patterns are configured. If only one pattern is configured, $a_0=0$, if two patterns are configured $a_0=1$.

$a_1, a_2, a_3, a_4$ are used to indicate the period. If only one pattern (i.e., pattern 1) is configured, the period is determined by Table 1. If two patterns (i.e., both pattern 1 and pattern 2) are configured, the period is determined by Table 2.

$a_5, a_6, a_7, a_8, a_9, a_{10}, a_{11}$ are used to indicate us which is determined by the following formula in case of $a_0=1$:

$$u_{slots}^{SL} = \left( \frac{u_{slots2} * 2^{\mu-\mu_{ref}} + \left\lfloor \frac{u_{sym2} * 2^{\mu-\mu_{ref}}}{L} \right\rfloor + I_s - A}{w} \right) * C +$$

$$\left( \frac{u_{slots} * 2^{\mu-\mu_{ref}} + \left\lfloor \frac{u_{sym} * 2^{\mu-\mu_{ref}}}{L} \right\rfloor + I_2 - B}{w} \right)$$

Where:

$$A = \mod\left(u_{slots2} * 2^{\mu-\mu_{ref}} + \left\lfloor \frac{u_{sym} * 2^{\mu-\mu_{ref}}}{L} \right\rfloor + I_2, w\right)$$

$$B = \mod\left(u_{slots} * 2^{\mu-\mu_{ref}} + \left\lfloor \frac{u_{sym} * 2^{\mu-\mu_{ref}}}{L} \right\rfloor + I_3, w\right)$$

$$C = \left\lceil \frac{P * 2^\mu + 1}{w} \right\rceil \text{ or } C = \left(\frac{P * 2^\mu + 1}{w}\right)$$

L is the number of symbols in a slot. L is equal to 12 if cyclic prefix of SL is extended CP; else, L is equal to 14.

$I_1$ is equal to $u_{sym} * 2^{\mu-\mu_{ref}} \mod L \leq L-Y$, else $I_1$ is equal to 0.

$I_2$ is equal to 1 if $u_{sym,2} * 2^{\mu-\mu_{ref}} \mod L \leq L-Y$, else $I_2$ is equal to 0.

Y is the sidelink starting symbol index in a slot provided by higher layer parameter.

w is the granularity of slots indication as described in Table 2.

$\mu$ equal to 0, 1, 2, or 3 corresponds to SL subcarrier spacing as defined in Table 3.

$\mu_{ref}$ is a reference SCS configured by referenceSubcarrierSpacing in TDD-UL-DL-ConfigCommon.

$u_{slots}$ is a number of slots with only uplink symbols configured by nrofUplinkSlots in pattern 1.

$u_{sym}$ is a number of uplink symbols configured by nrofUplinkSymbols in pattern 1.

$u_{slots,2}$ is a number of slots with only uplink symbols configured by nrofUplinkSlots in pattern 2.

$u_{sym2}$ is a number of uplink symbols configured by nrofUplinkSymbols in pattern 2.

P is period of pattern 1 as described in Table 2.

TABLE 1

Slot configuration period when one pattern is indicated

| $a_1, a_2, a_3, a_4$ | Slot configuration period of pattern1 P (msec) |
|---|---|
| 0, 0, 0, 0 | 0.5 |
| 0, 0, 0, 1 | 0.625 |
| 0, 0, 1, 0 | 1 |
| 0, 0, 1, 1 | 1.25 |
| 0, 1, 0, 0 | 2 |
| 0, 1, 0, 1 | 2.5 |
| 0, 1, 1, 0 | 4 |
| 0, 1, 1, 1 | 5 |
| 1, 0, 0, 0 | 10 |
| Reserved | Reserved |

TABLE 2

Slot configuration period and granularity when two patterns are indicated

| $a_1, a_2, a_3, a_4$ | Slot configuration period of pattern1 P (msec) | Slot configuration period of pattern2 P2 (msec) | Granularity w in slots with different SCS | | | |
|---|---|---|---|---|---|---|
| | | | 15 kHz | 30 kHz | 60 kHz | 120 kHz |
| 0, 0, 0, 0 | 0.5 | 0.5 | | | 1 | |
| 0, 0, 0, 1 | 0.625 | 0.625 | | | | |
| 0, 0, 1, 0 | 1 | 1 | | | | |
| 0, 0, 1, 1 | 0.5 | 2 | | | | |

TABLE 2-continued

Slot configuration period and granularity when two patterns are indicated

| $a_1,a_2,a_3,a_4$ | Slot configuration period of pattern1 P (msec) | Slot configuration period of pattern2 P2 (msec) | Granularity w in slots with different SCS | | | |
|---|---|---|---|---|---|---|
| | | | 15 kHz | 30 kHz | 60 kHz | 120 kHz |
| 0, 1, 0, 0 | 1.25 | 1.25 | | | | |
| 0, 1, 0, 1 | 2 | 0.5 | | | | |
| 0, 1, 1, 0 | 1 | 3 | | | 1 | 2 |
| 0, 1, 1, 1 | 2 | 2 | | | | |
| 1, 0, 0, 0 | 3 | 1 | | | | |
| 1, 0, 0, 1 | 1 | 4 | | | | |
| 1, 0, 1, 0 | 2 | 3 | | | | |
| 1, 0, 1, 1 | 2.5 | 2.5 | | | | |
| 1, 1, 0, 0 | 3 | 2 | | | | |
| 1, 1, 0, 1 | 4 | 1 | | | | |
| 1, 1, 1, 0 | 5 | 5 | | 1 | 2 | 4 |
| 1, 1, 1, 1 | 10 | 10 | 1 | 2 | 4 | 8 |

TABLE 3

SL subcarrier spacing

| μ | $\Delta f = 2^\mu \cdot 15$ [kHz] |
|---|---|
| 0 | 15 |
| 1 | 30 |
| 2 | 60 |
| 3 | 120 |

In some implementations, if a network node (such as a base station) configures only pattern 1, the following information is determined by the information carried in PSBCH:
1. Periodicity.
2. Number of UL slots or Number of SL slots.
3. Reference SCS.

The periodicity is determined by the periodicity configured in pattern 1, the number of UL slobs is determined by the number of UL shots that is configured in pattern 1, reference SCS is the reference subcarrier spacing which is used to determine the time domain boundaries. If SL is deployed on Uu carrier, only UL resource can be used for SL transmission. For example, for TDD system, only UL slots or UL symbols can be used for SL transmission; for FDD system, SL transmission can only be deployed on UL band. Alternatively, the number of SL slobs and/or number of SL symbols can be indicated in the PSBCH. In another implementation, the number of SL slots and/or number of SL symbols can be determined by the information carried in the PSBCH. The number of SL slots is determined by number of UL slots configured in pattern 1. The number of SL symbols is determined by number of UL symbols configured in pattern 1.

For example, the network node configures pattern 1 in TDD-UL-DL-ConfigCommon. And the parameter referenceSubcarrierSpacing is set to 15 kHz. In pattern 1, the parameter dl-UL-TransmissionPeriodicity is set to 5 ms (another example can be 3 ms), the number of UL slots is set to 1.

For the PSBCH, the parameter reference SCS is set to 15 kHz, which is set to the same value of parameter referenceSubcarrierSpacing configured by the network node. The parameter of periodicity in PSBCH is 5 ms (another example can be 3 ms). The information of number of UL (or SL) slots in PSBCH is determined by the number of UL slots in pattern 1. Then number of UL slots in PSBCH is 1.

For example, the network node configures pattern 1 in TDD-UL-DL-ConfigCommon. And the parameter referenceSubcarrierSpacing is set to 15 kHz. In pattern 1, the parameter dl-UL-TransmissionPeriodicity is set to 5 ms (another example can be 3 ms), the number of UL slots is set to 1.

For PSBCH, the parameter reference SCS can be set to 30 kHz, which is double of parameter referenceSubcarrierSpacing configured by the network node. The parameter of periodicity in PSBCH is 5 ms (another example can be 3 ms). The information of number of UL (or SL) slots in the PSBCH is determined by the number of UL slots in pattern 1 and the scale between the reference SCS in PSBCH and the referenceSubcarrierSpacing. Then it is 2, corresponding to 1 UL slot in pattern 1 considering the different reference SCS. The above implementations can reduce a payload size of the information (such as a TDD configuration) carried in the PSBCH. Further, in the above implementations, the slot structure is flexible to provide for better spectrum utilization.

In some implementations, if a network node (such as a base station) configures only pattern 1, the following information is determined by the information carried in PSBCH:
1. Periodicity.
2. Number of UL slots or Number of SL slots.

The periodicity is determined by the periodicity configured in pattern 1, the number of UL slots is determined by the number of UL slots that is configured in pattern 1. If SL is deployed on Uu carrier, only UL resource can be used for SL transmission. For example, for TDD system, only UL slots or UL symbols can be used for SL transmission; for FDD system, SL transmission can only be deployed on UL band. Alternatively, the number of SL slots and/or number of SL symbols can be indicated in PSBCH. In another implementation, the number of SL slots and/or number of SL symbols can be determined by the information carried in the PSBCH. The number of SL slots is determined by number of UL slots configured in pattern 1. The number of SL symbols is determined by number of UL symbols configured in pattern 1.

For example, the network configures only pattern 1 in TDD-UL-DL-ConfigCommon. And the parameter referenceSubcarrierSpacing is set to 15 kHz. In pattern 1, the parameter dl-UL-TransmissionPeriodicity is set to 5 ms (another example can be 3 ms), the number of UL slots is set to 1.

In one implementation, the pre-defined reference SCS (marked as the second reference SCS) is 15 kHz. The parameter of periodicity in the PSBCH is set to the same value as the parameter dl-UL-TransmissionPeriodicity in pattern 1. Therefore, the periodicity is 5 ms (another example can be 3). The information of number of UL (or SL) slots in PSBCH is determined by the number of UL slots in pattern 1. Since the parameter referenceSubcarrierSpacing is same as sidelink SCS, the number of UL slots in PSBCH is 1.

In one implementation, the pre-defined reference SCS (marked as the second reference SCS) is 30 kHz. The parameter of periodicity in PSBCH is set to the same value as the parameter dl-UL-TransmissionPeriodicity in pattern 1. Therefore, the periodicity is 5 ms (another example can be 3 ins). The information of number of UL (or SL) slots in PSBCH is determined by the corresponding number of UL slots in pattern 1. Considering the second reference SCS doubles the parameter referenceSubcarrierSpacing, the number of UL (or SL) slots in PSBCH is 2, which is determined by the number of UL slots in pattern 1 and the scale between the second reference SCS and referenceSubcarrierSpacing. The above implementations can reduce a payload size of the information (such as a TDD configuration) carried in the PSBCH. Further, in the above implementations, the slot structure is flexible to provide for better spectrum utilization.

Commercial interests for some implementations are as follows. 1. Reducing a payload size of the information (such as a TDD configuration) carried in the PSBCH. 2. The slot structure is flexible to provide for better spectrum utilization. 3. Providing a good communication performance. 4. Providing a high reliability. 5. Some implementations of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some implementations of the present disclosure are a combination of "techniques/processes" that can be adopted in 3GPP specification to create an end product. Some implementations of the present disclosure propose technical mechanisms.

Figure 4:
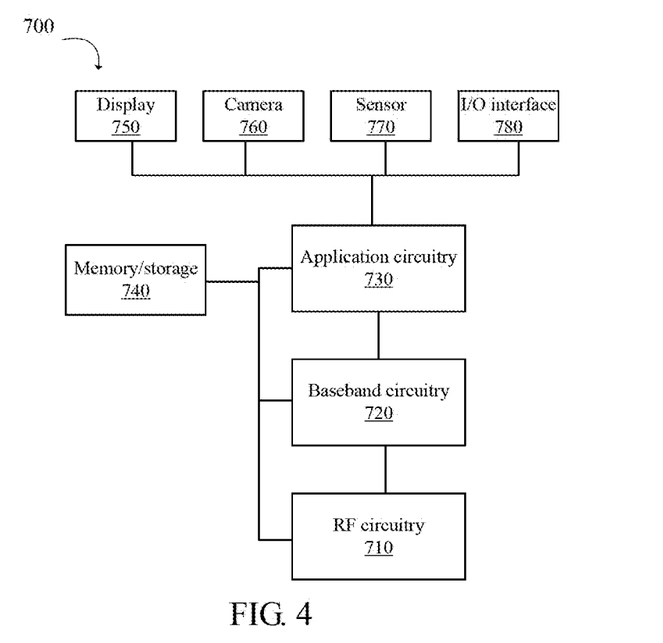
FIG. 4 is a block diagram of a system for wireless communication according to an implementation of the present disclosure.

FIG. 4 is a block diagram of an example system 664 for wireless communication according to an implementation of the present disclosure. Implementations described herein may be implemented into the system using any suitably configured hardware and/or software. FIG. 4 illustrates the system 664 including a radio frequency (RF) circuitry 560, a baseband circuitry 654, an application circuitry 664, a memory/storage 560, a display 564, a camera 640, a sensor 647, and an input/output (I/O) interface 654, coupled with each other at least as illustrated.

The application circuitry 664 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system. The baseband circuitry 654 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some implementations, the baseband circuitry may provide for communication compatible with one or more radio technologies. For example, in some implementations, the baseband circuitry may support communication with an evolved universal terrestrial radio access network (EUTRAN) and/or other wireless metropolitan area networks (WMAN), a wireless local area network (WLAN), a wireless personal area network (WPAN). Implementations in which the baseband circuitry is configured to support radio communications of more than one wireless protocol may be referred to as multi-mode baseband circuitry.

In various implementations, the baseband circuitry 654 may include circuitry to operate with signals that are not strictly considered as being in a baseband frequency. For example, in some implementations, baseband circuitry may include circuitry to operate with signals having an intermediate frequency, which is between a baseband frequency and a radio frequency. The RF circuitry 560 may enable communication with wireless networks using modulated electromagnetic radiation through a non-solid medium. In various implementations, the RF circuitry may include switches, filters, amplifiers, etc. to facilitate the communication with the wireless network. In various implementations, the RF circuitry 560 may include circuitry to operate with signals that are not strictly considered as being in a radio frequency. For example, in some implementations, RF circuitry may include circuitry to operate with signals having an intermediate frequency, which is between a baseband frequency and a radio frequency.

In various implementations, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some implementations, the electronic device circuitry may be implemented in, or functions associated with the circuitry may be implemented by, one or more software or firmware modules. In some implementations, some or all of the constituent components of the baseband circuitry, the application circuitry, and/or the memory/storage may be implemented together on a system on a chip (SOC).

The memory/storage 560 may be used to load and store data and/or instructions, for example, for system. The memory/storage for one implementation may include any combination of suitable volatile memory, such as dynamic random access memory (DRAM)), and/or non-volatile memory, such as flash memory. In various implementations, the I/O interface 654 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various implementations, the sensor 647 may include one or more sensing devices to determine environmental conditions and/or location information related to the system. In some implementations, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various implementations, the display 564 may include a display, such as a liquid crystal display and a touch screen display. In various implementations, the system 664 may be a mobile computing device such as, but not limited to, a laptop computing device, a tablet computing device, a netbook, an ultrabook, a smartphone, etc. In various implementations, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the implementations of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned implementation since the working processes of the above-mentioned system, device, and unit are basically the same. For easy description and simplicity, these working processes will not be detailed.

It is understood that the disclosed system, device, and method in the implementations of the present disclosure can be realized with other ways. The above-mentioned implementations are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms. The units as separating components for explanation are or are not physically separated. The units for display are or are not physical units, that is, located in one place or distributed on a plurality of network units. Some or all of the units are used according to the purposes of the implementations. Moreover, each of the functional units in each of the implementations can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the implementations of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred implementations, it is understood that the present disclosure is not limited to the disclosed implementations but is intended to cover various arrangements made without departing from the scope of the broadest interpretation of the appended claims.

What is claimed is:

1. A method for transmitting a physical sidelink broadcast channel (PSBCH) of a first user equipment, comprising:
    transmitting, to one or more second user equipments, a PSBCH carrying information, wherein the information carried in the PSBCH is used to determine a periodicity and a number of slots wherein the slots comprise sidelink (SL) slots; and
    obtaining a first reference subcarrier spacing (SCS), wherein the first reference SCS is configured by the network;
    wherein the number of slots which is determined by the information carried in the PSBCH is further determined by the first reference SCS and a second reference SCS, wherein the second reference SCS is pre-configured, or determined by the information carried in the PSBCH.

2. The method of claim 1, wherein only a pattern 1 is configured by a network, the information carried in PSBCH is determined by parameters configured in pattern 1.

3. The method of claim 2, wherein the periodicity which is determined by the information carried in the PSBCH is determined by a periodicity configured in the pattern 1.

4. The method of claim 2, wherein the number of slots which is determined by the information carried in the PSBCH is determined by a number of slots configured in the pattern 1.

5. The method of claim 4, wherein the slots configured in the pattern 1 comprise UL slots.

6. The method of claim 1, wherein both a pattern 1 and a pattern 2 are configured by the network, the information carried in PSBCH is determined by parameters configured in pattern 1 and/or pattern 2.

7. The method of claim 6, wherein the periodicity which is determined by the information carried in the PSBCH is determined by a first periodicity configured in the pattern 1 and a second periodicity configured in the pattern 2.

8. The method of claim 6, wherein the number of slots which is determined by the information carried in the PSBCH is determined by a number of slots configured in at least one of the pattern 1 and the pattern 2.

9. The method of claim 8, wherein the slots configured in at least one of the pattern 1 and the pattern 2 comprise UL slots.

10. The method of claim 1, wherein the information carried in the PSBCH further determines a number of symbols wherein the symbols comprise SL symbols.

11. The method of claim 1, wherein the first user equipment is in coverage of a cell.

12. A first user equipment for transmitting a physical sidelink broadcast channel (PSBCH), comprising:
    a memory;
    a transceiver; and
    a processor coupled to the memory and the transceiver, wherein the processor is configured to control the transceiver to transmit, to one or more second user equipments, a PSBCH carrying information, wherein the information carried in the PSBCH is used to determine a periodicity and a number of slots wherein the slots comprise sidelink (SL) slots; and obtain a first reference subcarrier spacing (SCS), wherein the first reference SCS is configured by a network;

wherein the number of slots which is determined by the information carried in the PSBCH is further determined by the first reference SCS and a second reference SCS, wherein the second reference SCS is pre-configured, or determined by the information carried in the PSBCH.

13. The first user equipment of claim 12, wherein only a pattern 1 is configured by a network, the information carried in PSBCH is determined by parameters configured in pattern 1, the periodicity which is determined by the information carried in the PSBCH is determined by a periodicity configured in the pattern 1, the number of slots which is determined by the information carried in the PSBCH is determined by a number of slots configured in the pattern 1, the slots configured in the pattern 1 comprise UL slots.

14. The first user equipment of claim 12, wherein both a pattern 1 and a pattern 2 are configured by the network, the information carried in PSBCH is determined by parameters configured in pattern 1 and/or pattern 2, the periodicity which is determined by the information carried in the PSBCH is determined by a first periodicity configured in the pattern 1 and a second periodicity configured in the pattern 2, the number of slots which is determined by the information carried in the PSBCH is determined by a number of slots configured in at least one of the pattern 1 and the pattern 2, the slots configured in at least one of the pattern 1 and the pattern 2 comprise UL slots.

15. The first user equipment of claim 12, wherein the information carried in the PSBCH further determines a number of symbols wherein the symbols comprise SL symbols.

16. The first user equipment of claim 12, wherein the first user equipment is in coverage of a cell.

* * * * *